Nov. 7, 1939.     J. P. SPANG     2,179,025
MEAT-SLITTING MACHINE
Original Filed Dec. 16, 1936    4 Sheets-Sheet 1
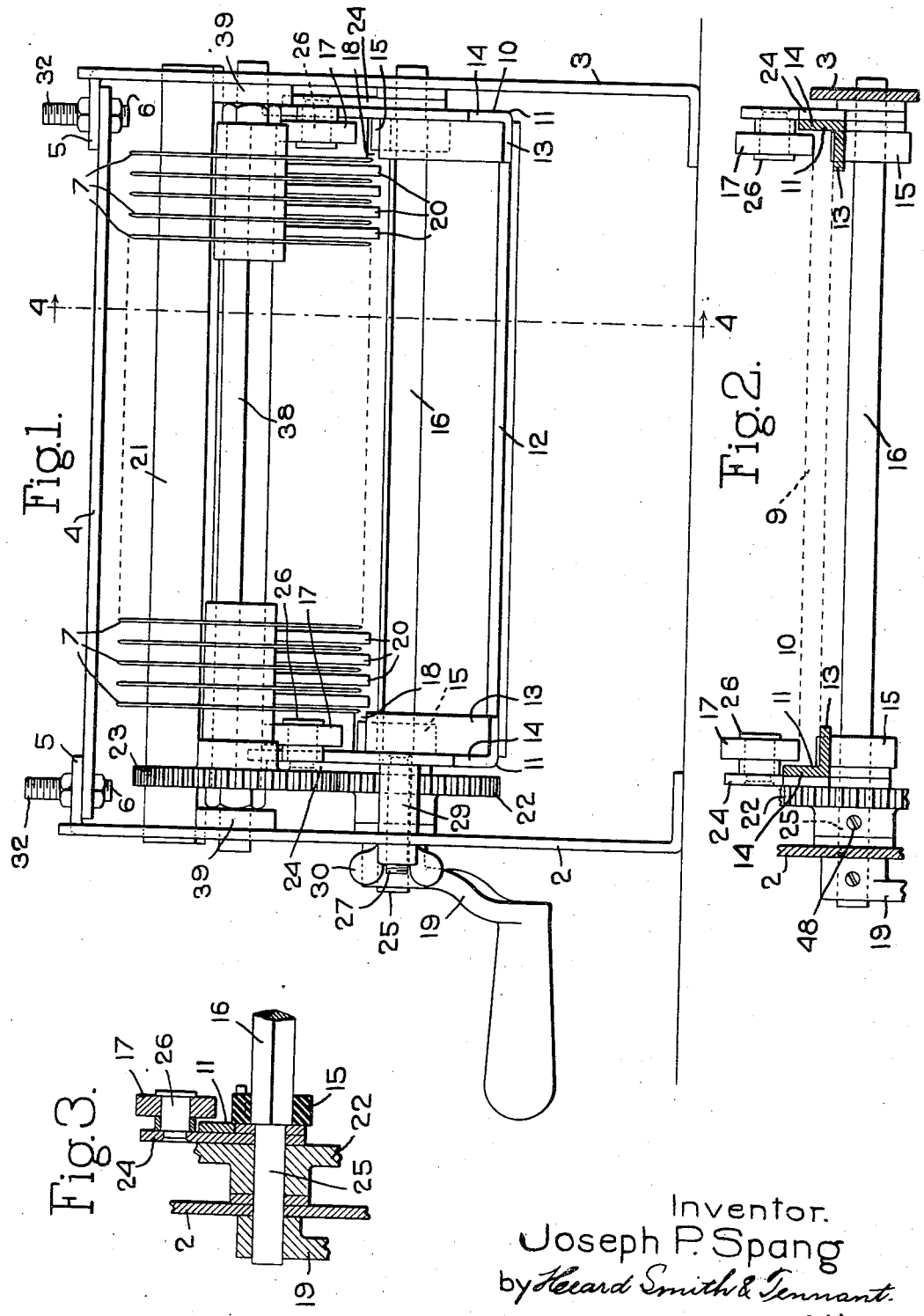
Inventor.
Joseph P. Spang
by Heard Smith & Tennant
Attys.

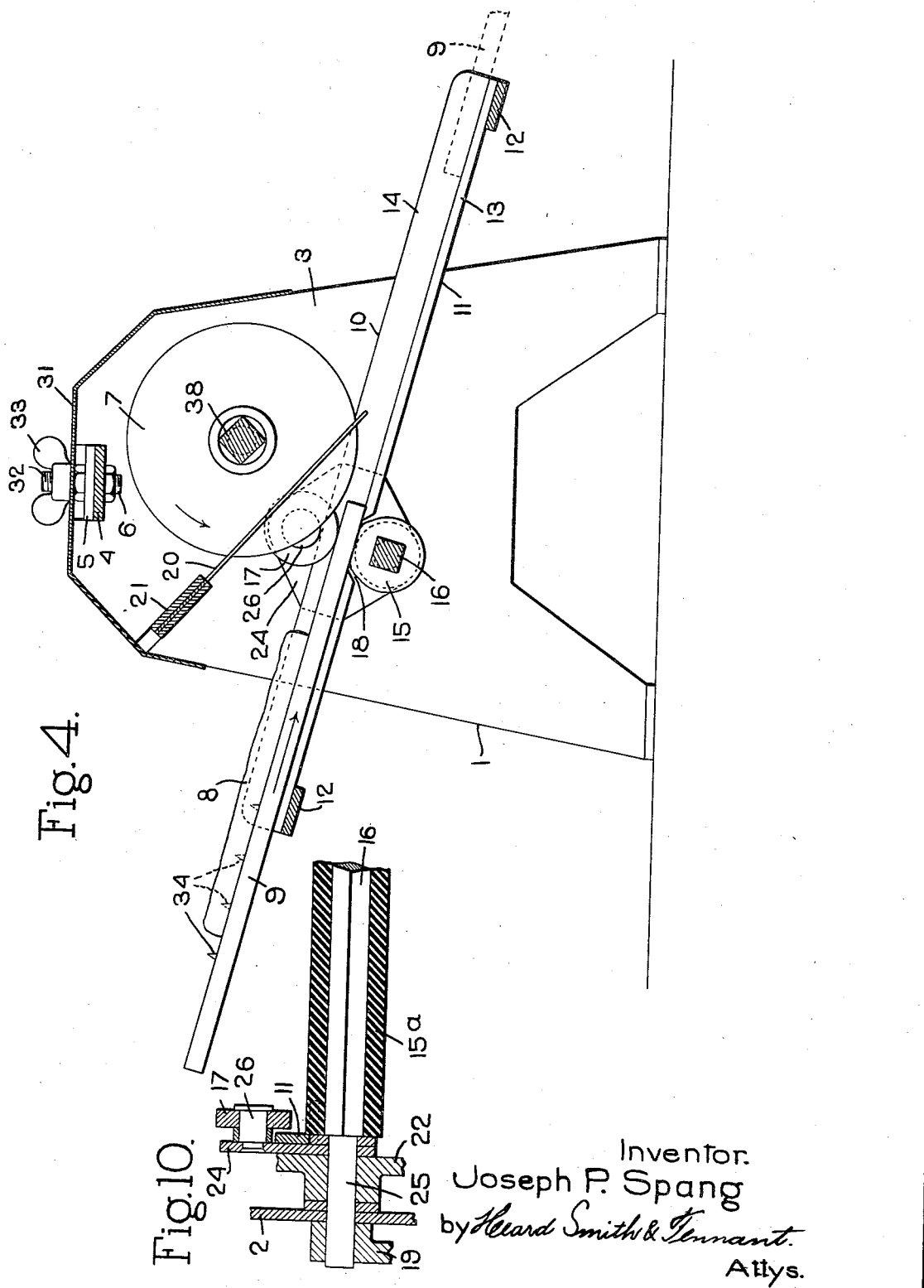

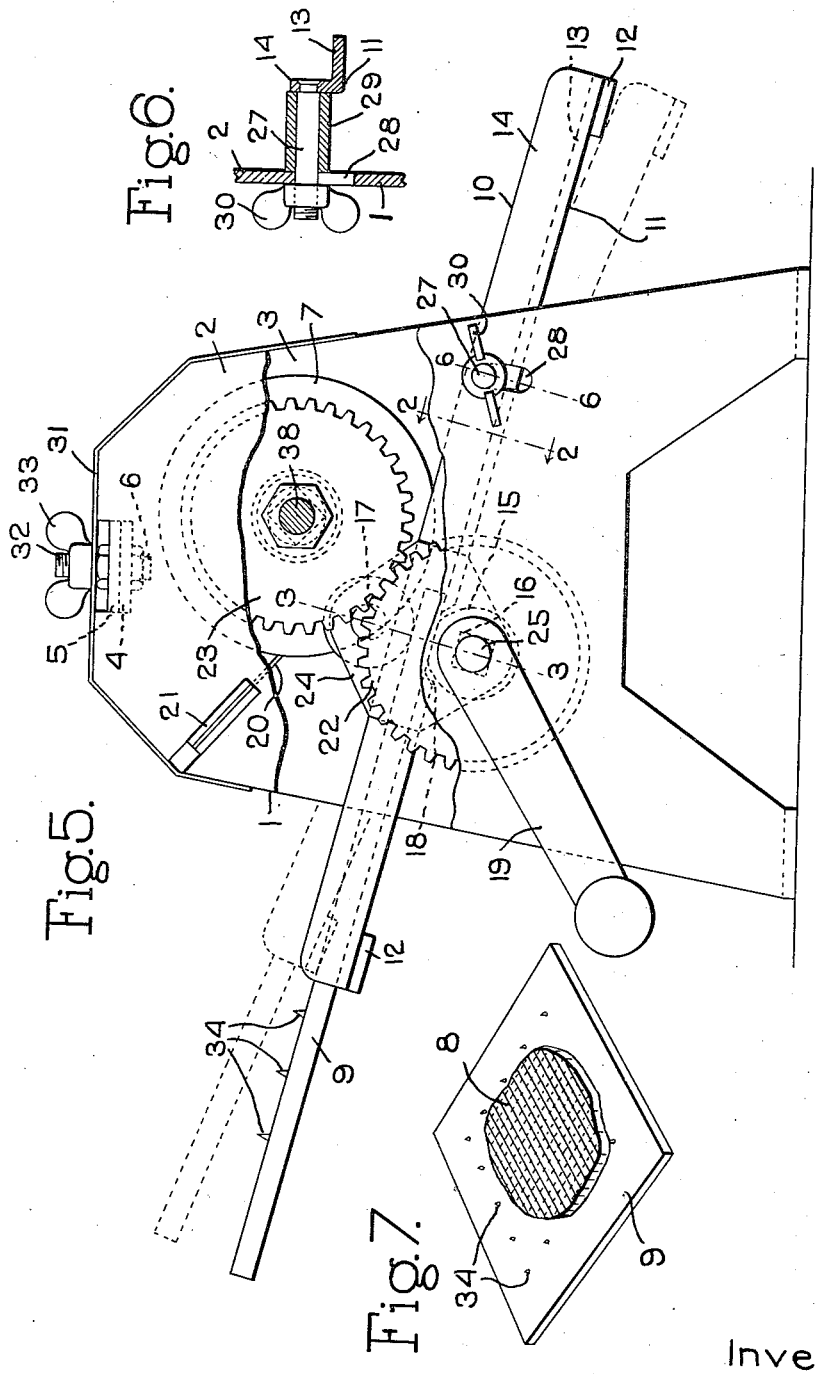

Nov. 7, 1939.  J. P. SPANG  2,179,025
MEAT-SLITTING MACHINE
Original Filed Dec. 16, 1936   4 Sheets—Sheet 4
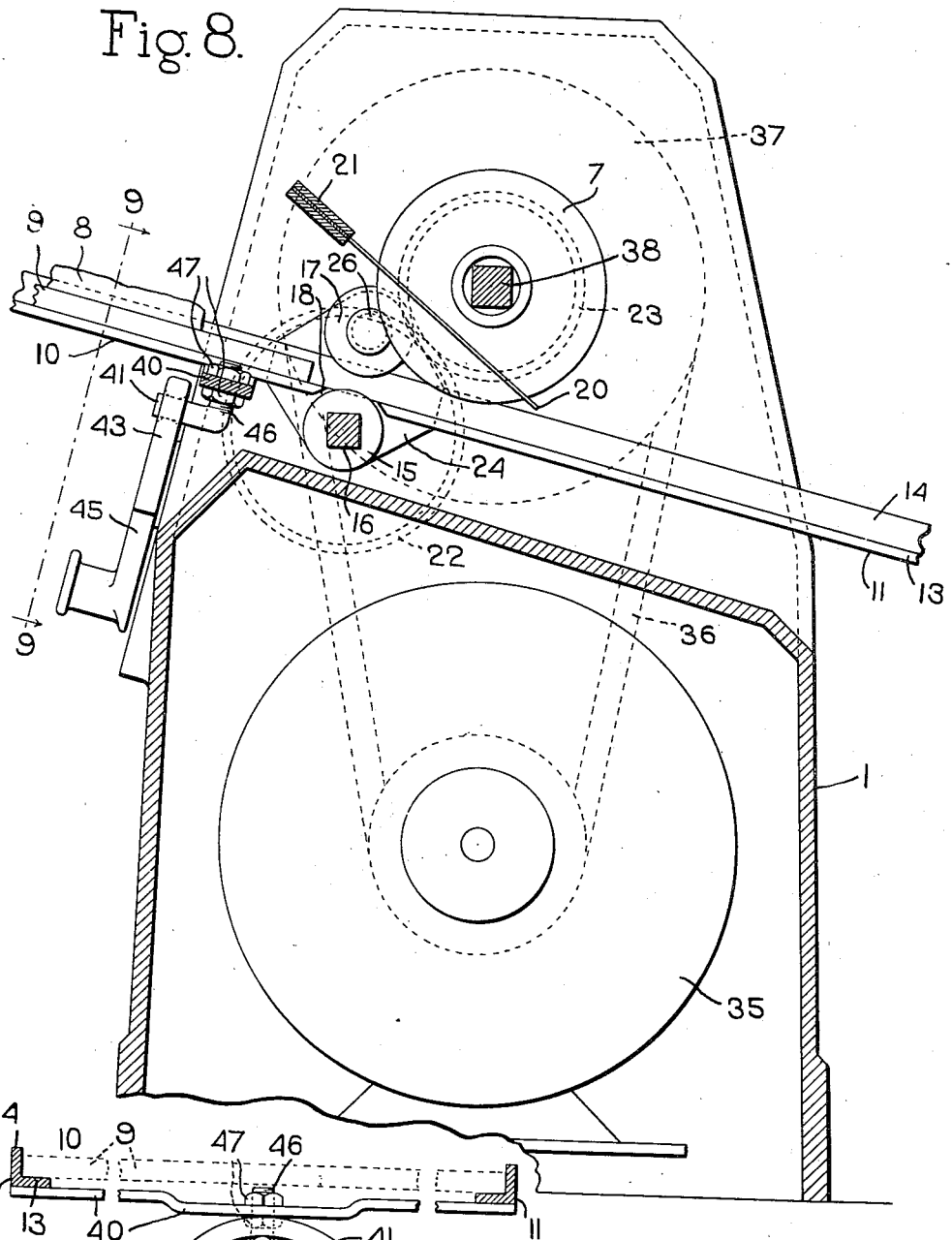
Fig. 8.
Fig. 9.
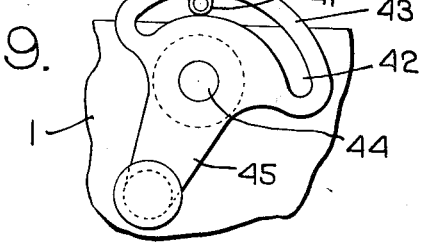
Inventor.
Joseph P. Spang
by Heard Smith & Tennant.
Attys.

Patented Nov. 7, 1939

2,179,025

UNITED STATES PATENT OFFICE 2,179,025

MEAT-SLITTING MACHINE

Joseph P. Spang, Quincy, Mass.

Application December 16, 1936, Serial No. 116,130
Renewed May 8, 1939

5 Claims. (Cl. 17—27)

This invention relates to meat-slitting machines of that type comprising a set of rotary slitting knives and a meat-supporting plate on which the slice of meat to be slit is placed and which is introduced into the machine at one side of the knives and is fed past the knives which operate to cut the slits in the meat, and then is discharged from the machine at the other side of the knives while still supporting the slit slice of meat.

An object of the invention is to provide an improved meat-slitting machine of this type which is simple in its construction and inexpensive to manufacture and which is efficient and rapid in operation.

In order to give an understanding of the invention I have illustrated in the drawings a selected embodiment thereof which will now be described after which the novel features will be pointed out in the appended claims.

In the drawings;

Fig. 1 is an end view of a machine embodying the invention;

Fig. 2 is a section on the line 2—2, Fig. 5;

Fig. 3 is a section on the line 3—3, Fig. 5;

Fig. 4 is a section on the line 4—4, Fig. 1;

Fig. 5 is a side view of the machine with parts broken out;

Fig. 6 is a section on the line 6—6, Fig. 5;

Fig. 7 is a perspective view of the meat-supporting plate;

Fig. 8 is a view showing a different embodiment of the invention;

Fig. 9 is a section, with parts broken out, on the line 9—9, Fig. 8.

Fig. 10 is a fragmentary section showing a different embodiment of the invention.

The machine comprises a suitable frame indicated generally at 1 and comprising two end members 2 and 3 which are shown as connected at their upper ends by a cross rail 4, said end members 2 and 3 each having an inwardly-extending flange 5 to which the ends of the connecting cross rail 4 are connected by means of clamping bolts 6.

Rotatably supported by the end members 2 and 3 of the frame is a set of rotary slitting knives 7, said knives being mounted upon a shaft 38 which is rotatably mounted in bearings 39 carried by the frame members 2 and 3. These knives are spaced from each other as usual in meat-slitting machines, and means hereinafter described are provided for rapidly rotating the knives for performing the meat-slitting operation.

As stated above this meat-slitting machine is of that type in which the slice of meat to be slit, and which is indicated at 8, is carried by a meat-supporting plate 9 which is separable from the frame 1 but is adapted to be introduced into the machine at one side and to be fed past the knives from one side thereof to the other, during which feeding movement the knives cut the slits in the meat, and then to be discharged from the machine at the opposite side thereof. This meat-supporting plate 9 is guided in its movement past the knives by means of a guiding member indicated generally at 10 and which comprises two angle-iron side rails 11 which are connected at each end by a cross bar 12. The meat-supporting plate 9 rests on and is supported by the horizontal legs 13 of the angle-iron members 11, and the vertical legs 14 of said angle-iron members serve to prevent lateral movement of the plate during its forward feeding movement.

The meat-supporting plate 9 with the unslit slice of meat 8 thereon is introduced into the guiding member 10 at one side of the knives, as shown in full lines in Fig. 4, and then is fed along the guiding member past the knives and is discharged from the machine on the other side of the knives as indicated in dotted lines Fig. 4. The passage of the plate 9 with its slice of meat 8 past the knives will result in a plurality of parallel slits being cut in the meat. After the plate has been given one pass beneath the knives and has been discharged from the machine, then it may be introduced into the machine again in a position so that the slits which were cut in the meat by the first pass of the plate through the machine extend at right angles to the direction of movement, with the result that during the second pass through the machine the second series of slits will be cut at right angles to the first series. It will be noted that the meat-supporting plate 9 is rectangular in shape with sides of equal length so that it can be fed through the machine with any one of the sides in the lead. As the plate is thus being fed through the machine the sides thereof which are parallel to the direction of movement cooperate with the vertical legs 12 of the angle-iron members 11 to prevent the plate from turning so that straight slits will be cut in the meat.

As stated above the knives 7 are positively and rapidly rotated, and the present invention embodies a novel means for controlling the feeding movement of the meat-supporting plate 9 through the machine so that it will be restrained from having too rapid a movement due to the friction between the rapidly rotating knives and the meat and which will give said plate a feeding movement at such a speed that the knives will slit the meat with a slicing or draw cut.

The feeding means herein shown for feeding the meat-supporting plate through the machine comprises a feed roll or rolls acting on the under side of the plate and means for holding the plate in frictional contact with the feed roll or rolls. The feed roll or rolls are carried and rotated by a feed shaft 16 which is journalled in the end members 2 and 3 of the frame and may be driven in any suitable way as by means of a crank handle 19 which is fast on one end thereof.

This feeding device may take the form of two separate feed rolls 15 mounted on said shaft 16 and each adapted to engage the plate at the edge portion thereof, as shown in Figs. 1, 2 and 3, or it may take the form of a single roll 15a extending the full width of the plate as shown in Fig. 10. The feed roll or rolls 15 or 15a are positively driven by means of the crank 19 and they may be made of any material, such as rubber, which will afford a proper frictional engagement with the meat-supporting plate 9.

For holding the plate in frictional engagement with the feed roll or rolls, I have shown two presser rolls 17, one at each side of the guiding member 10 and which are adapted to engage the top surface of the plate 9 at its opposite edges. The horizontal leg 13 of each angle-iron member 11 is cut away as shown at 18 to receive the feed roll, and I will preferably make the feed roll of sufficient diameter so that normally it projects slightly through the opening 18 and above the plate-supporting surface of the horizontal legs 13, as shown in Figs. 1, 2 and 8.

The material of which the feed roll is made, whether or not it be of rubber, is preferably slightly yielding and the presser rolls 17 are so disposed that when the plate 19 is passing between the presser rolls and feed rolls the latter will be distorted slightly, thereby providing a sufficient frictional grip on the plate so that the movement of the latter through the machine will be controlled by said feed rolls.

When the meat is being acted on by the rapidly rotating knives the friction between the knives and the meat tends to pull the meat and the plate forwardly. The feed roll or rolls herein shown serve to control the forward feeding movement of the plate and if the action of the knives on the meat tends to feed the plate forward too rapidly the feed rolls provide a retarding force which resists this tendency. On the other hand, if the friction of the knives on the meat does not provide sufficient pulling or feeding force to feed the meat forwardly the frictional engagement of the feed roll or rolls with the plate serves to produce the proper feeding movement of the plate. In either case the feed roll or rolls will control the feeding movement of the plate through the machine and will determine the speed at which it moves so that this speed will be the proper speed to insure that the knives act on the meat with the desired slicing or draw cut.

20 indicates a stripper device in the form of yielding fingers that extend between the knives 7 and serve to prevent the meat from being lifted from the plate by the rotary movement of the slitting knives 7. The stripper fingers are carried by a suitable supporting head 21.

I have stated that the knives 7 were positively driven, and while this may be accomplished in any approved way, yet I have herein shown a driving connection between the knife shaft 38 and the feed roll shaft 16 by which rotation of the shaft 16 is conveyed to the knife shaft 38. The feed shaft 16 is shown as having a gear 22 thereon which meshes with a gear 23 fast on the knife shaft 38.

The speed of feeding movement of the plate 9 is determined by the size of the feed rolls 15 and the speed of rotation of the feed shaft 16. The gear 22 is considerably larger than the feed rolls 15 and is shown as the same size as the gear 23. The knives 7 are shown as having a greater diameter than the gear 23, and as a result of this construction the peripheral speed of the knives 7 will be very much greater than that of the feed rolls 15, and as the feeding movement of the plate 9 is governed by the surface speed of the feed rolls 15 it follows that the cutting edges of the knives will be moving very much faster than the meat so that the knives will cut the meat with a slicing cut.

The machine herein shown is provided with means by which the depth of the slits cut in the meat can be varied, and for this purpose the guiding member 10 is mounted so that it can be adjusted toward and from the knives 7, thereby placing the meat-supporting surface of the plate 9 closer to or farther from the edge of the knives 7 as the plate moves past the knives.

Each angle-iron member 11 of the guide 10 is secured to a plate 24 which is mounted on the shaft 16 for turning movement thereabout, the end portions 25 of said shaft 16 which extend through the plates 24 being cylindrical so that said end portions 25 provide a pivotal support for the guide 10. The portions of the shaft on which the feed rolls 15 are mounted are shown as non-circular.

Each presser roll 17 is loosely mounted on a stud 26 which is anchored in the upper portion of the corresponding plate 24, and as the plate 25 and the guide 10 are rigid with each other the fixed relation between the presser rolls and the feed rolls is not disturbed by any turning movement of the guide about its pivotal support.

A turning movement of the guide 10 clockwise about its pivotal support into the dotted line position Fig. 5 will move the horizontal plate-supporting legs 13 of the guide 10 away from the knives, while a turning movement of the guide in the opposite direction will move said plate-supporting legs toward the knives, and hence by adjusting the guide 10 into different positions about its pivotal support the slits in the meat can be cut to any desired depth.

I have provided herein means for securing the guide 10 in any adjusted position. For this purpose one of the angle-iron members 11 has a threaded stud 27 projecting therefrom which extends through a slot 28 in the end member 2. Mounted on this projection is a spacing sleeve 29 which fits between the angle-iron member 11 and the inner face of the end member 2. The projecting end of the stud 27 has a clamping nut 30 thereon so that by tightening the nut 30 the guide 10 will be held in any adjusted position.

In using the device the guide 10 will be adjusted into the correct position to produce slits in the meat of the desired depth, and the plate 9 having a slice 8 of meat thereon is then introduced into the guide 10 at one side of the machine as shown in full lines, Fig. 1, and the plate is manually moved along the guide until it is gripped by the feed rolls 15 and presser rolls 17. As soon as this occurs the feed rolls serve to feed the plate forward and as it passes beneath the knives 10 the latter cut the slits in the meat. The feed rolls are operated until the plate has been discharged therefrom, and the plate is then removed from the lower end of the guide 10. If it is desired to cut in the meat a second series of slits extending at right angles to those which were cut by the first pass of the plate through the machine, then the plate 9 with its slice of meat 8 thereon is again fed through the machine but in the second feeding movement it is placed in the guide with the slits in the meat extending at right angles to the feeding movement.

When the meat is fed through the second time the knives will cut slits therein which cross the slits made during the first pass of the meat through the machine.

If desired the plate 9 may have pins or projections 34 rising therefrom which serve to retain the meat thereon and prevent the meat from being pulled off from the plate by rapidly moving knives.

31 indicates a cover which partially encloses and protects the knives 7. The cover is provided with apertures through which extend extensions 32 of the clamping bolts 6 and the cover is held in place by clamping nuts 33 screwed to the extensions 32.

In Figs. 8 and 9 I have shown a different embodiment of the invention in which the knives 7 are power driven from a motor after the manner illustrated in my co-pending application Serial No. 91,676, filed July 21, 1936.

Referring to Fig. 8, 35 indicates the motor which is connected by a driving belt 36 to a pulley 37 on the knife shaft. The knife shaft 38 and feed shaft 16 are connected by intermeshing gears 22, 23 as in the other embodiments of the invention.

In the construction shown in Fig. 8 the feed shaft 16 is driven from the knife shaft, while in the construction shown in Figs. 1-7 the power is applied to the feed shaft 16 and the knife shaft 38 is rotated from the feed shaft.

The construction shown in Figs. 8 and 9 also embodies a different device for adjusting the plate-supporting guide 10 and holding it in its adjusted position.

The two angle-iron members 11 are shown as connected by a cross piece 40 having a downwardly offset central portion to which is secured a follower 41 operating in a cam groove 42 formed in a cam 43 which is pivoted to the frame of the machine at 44. This cam has a handle or arm 45 by which it may be adjusted. The turning of the cam counter-clockwise in Fig. 9 will serve to elevate the left-hand end of the plate-supporting guide 10 and to lower the right-hand end thereby increasing the space between the guide and the knives which will result in reducing the depth of the slits cut in the meat. On the other hand a turning movement of a cam in a clockwise direction will lower the left-hand end of the guide 10 and raise the right-hand end, thus reducing the space between the guide and the knives and increasing the depth of the slits which are cut in the meat.

The follower 41 is shown as an angular-shaped element, the vertical arm 46 of which extends through the cross member 40 and is anchored therein by means of clamping nuts 47. The horizontal arm of the follower extends through and cooperates with the cam slot 42.

The adjusting cam shown in Figs. 8 and 9 not only provides means for adjusting the plate-supporting guide 10 vertically but it also serves to hold the plate immovable in any adjusted position. It will be noted that any force to which the plate-supporting guide is subjected that would tend to turn it out of any predetermined position is transmitted to the cam in a radial direction, and as the follower operates in a cam groove, the cam will securely hold the plate in any position into which it may be adjusted.

I claim:

1. A meat-slitting machine comprising a frame, a set of rotary slitting knives rotatably mounted thereon, means to rotate the knives, a meat-supporting plate separable from the frame and on which the slice of meat to be slit is supported, a feed roll having a shaft, rotatably mounted in the frame, a plate-supporting member carried by said shaft and adapted to receive the plate on one side of the knives and over which the plate may slide completely past the knives to the other side of the machine where it is discharged therefrom, said feed roll contacting with and controlling the feeding movement of the plate, and means to rotate the feed roll at a slower surface speed than the peripheral speed of the knives whereby the knives will act on the meat with a draw cut.

2. A meat-slitting machine comprising a frame, a set of rotary slitting knives rotatably mounted thereon, means to rotate said knives, a meat-supporting plate separable from the frame and on which the slice of meat is supported, a feed roll having a shaft, rotatably mounted in the frame, a plate-supporting member carried by said shaft and adjustable into different angular positions about the axis thereof, said plate-supporting member being adapted to receive the plate on one side of the knives and to guide said plate in its feeding movement past the knives to the other side thereof, said feed roll engaging the plate and controlling its feeding movement, and means to rotate the feed roll at a surface speed less than the peripheral speed of the knives.

3. A meat-slitting machine comprising a frame, a set of rotary slitting knives rotatably mounted thereon, means to rotate the knives rapidly, a meat-supporting plate separable from the frame and adapted to support the slice of meat to be slit, upper and lower feed rolls situated non-axially of the knives and adapted to engage the upper and lower faces of the plate at opposite edges and by which the plate is fed from one side of the machine past the knives to the opposite side of the machine where it is discharged, and means to rotate the rolls with a slower surface speed than the peripheral speed of the knives, whereby said rolls overcome any tendency of the plate to be fed with a rapid motion due to the action of the rapidly rotating knives on the meat and also operate to feed the plate forward at a slower speed than the peripheral speed of the knives, whereby said knives act on the meat with a draw cut.

4. A meat-slitting machine comprising a frame, a set of rotary slitting knives carried thereby, means to rotate the knives rapidly, a plate-supporting member beneath the knives, a meat-supporting plate separable from said member and adapted to slide thereover from a position entirely on one side of the knives, completely past the knives, to a position entirely on the other side of the knives and to be discharged from said member, a stripper element for holding the meat against the plate as it is acted on by the knives, and means other than the stripper element to apply directly to the plate a retarding force in opposition to the forward movement given to the plate by the action of the knives on the meat, whereby the knives operate to slit the meat with a draw cut.

5. A meat-slitting machine comprising a frame, a set of rotary slitting knives rotatably mounted therein, means to rotate the knives rapidly, a plate-supporting member beneath the knives, a meat-supporting plate separable from said member and adapted to slide thereover from one side of the machine to the other, a stripper element for holding the meat against the plate as it is acted upon by the knives, a feed roll having a friction surface situated to engage the under face of the plate as it moves past the knives, a relatively short idle presser roll situated to engage the upper face of the plate at each edge and hold it in frictional contact with the feed roll, and means to rotate the feed roll at a surface speed slower than the peripheral speed of the knives.

JOSEPH P. SPANG.